US007974250B2

(12) United States Patent
Jang et al.

(10) Patent No.: US 7,974,250 B2
(45) Date of Patent: Jul. 5, 2011

(54) POWER SAVING APPARATUS AND METHOD IN A WIRELESS COMMUNICATION SYSTEM

(75) Inventors: Kyung-Hun Jang, Suwon-si (KR); Young-Soo Kim, Seoul (KR); Jung-Hoon Suh, Yongin-si (KR); Dong-Jun Lee, Seoul (KR); Jong-Ho Park, Suwon-si (KR); Tae-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1422 days.

(21) Appl. No.: 11/451,650

(22) Filed: Jun. 13, 2006

(65) Prior Publication Data

US 2006/0285526 A1 Dec. 21, 2006

(30) Foreign Application Priority Data

Jun. 15, 2005 (KR) ........................ 10-2005-0051186

(51) Int. Cl.
*H04W 4/00* (2009.01)
(52) U.S. Cl. ........ 370/338; 370/311; 370/318; 455/518; 455/450
(58) Field of Classification Search .................. 370/311, 370/318, 338; 455/450, 518
See application file for complete search history.

(56) References Cited

U.S. PATENT DOCUMENTS

| 2004/0072559 | A1 | 4/2004 | Kakumaru et al. | |
|---|---|---|---|---|
| 2004/0264397 | A1 | 12/2004 | Benveniste | |
| 2005/0003794 | A1 | 1/2005 | Liu | |
| 2005/0018624 | A1* | 1/2005 | Meier et al. | 370/318 |
| 2005/0047357 | A1* | 3/2005 | Benveniste | 370/311 |

FOREIGN PATENT DOCUMENTS

| KR | 1020030070381 | 8/2003 |
|---|---|---|
| KR | 1020050002192 | 1/2005 |
| KR | 1020050003575 | 1/2005 |
| WO | WO 00/10353 | 2/2000 |
| WO | WO 2005/011204 | 2/2005 |

OTHER PUBLICATIONS

Seongkwan Kim et al., A High-Throughput MAC Strategy for Next-Generation WLANs, Proceedings of the Sixth IEEE International Symposium on a World of Wireless Mobile and Multimedia Networks, 2005 IEEE, pp. 1-8.
Youngsoo Kim et al., Throughput Enhancement of IEEE 802.11 WLAN via Frame Aggregation, 2004 IEEE, pp. 3030-3034.
Jean Lorchat et al., Energy Saving in IEEE 802.11 Communications using Frame Aggregation, GLOBECOM 2003, pp. 1296-1300.
Begonya Otal et al., Power Saving Efficiency of a Novel Packet Aggregation Scheme for High-Throughput WLAN Station at Different Data Rates, 2005 IEEE, pp. 1-5.

* cited by examiner

*Primary Examiner* — Pierre-Louis Desir
(74) *Attorney, Agent, or Firm* — The Farrell Law Firm, P.C.

(57) ABSTRACT

A power saving apparatus and a method in a wireless communication system are provided. An Access Point (AP) buffers transmission frames for sleep-mode stations in a sleep-mode buffer. Upon wakeup from a sleep mode, a station sends a first control information frame indicating wakeup to the access point. The access point sends a second control information frame including a requested transmission length in response to the first control information frame to the station. The station generates a third control information frame, aggregates the third control information frame and user data frames to a first protocol data unit, and sends it to the AP. Then the AP generates a fourth control information frame, aggregates the fourth control information frame and buffered frames to a second protocol data unit, and sends it to the station.

21 Claims, 14 Drawing Sheets

POWER SAVING APPARATUS AND METHOD IN A WIRELESS COMMUNICATION SYSTEM

PRIORITY

This application claims priority under 35 U.S.C. §119 to an application entitled "Power Saving Apparatus and Method in a Wireless Communication System" filed in the Korean Intellectual Property Office on Jun. 15, 2005 and assigned Serial No. 2005-51186, the contents of which are incorporated herein by reference.

BACKGROUND OF THE INVENTION

1. Field of the Invention

The present invention relates generally to an apparatus and method for a power-saving mode operation, and in particular, to an apparatus and method for enabling a station to wake up periodically or non-periodically, to carry out data transmission and reception for a time, and then to transition to a sleep mode.

2. Description of the Related Art

A Wireless Local Area Network (WLAN), based on Institute of Electrical and Electronic Engineers (IEEE) 802.11, is an expansion of an existing wired LAN. It was developed for short-range communications for stationary users in restricted areas like indoor locations, densely populated downtowns, or university libraries. The WLAN offers Internet connectivity at a high rate of between 11 and 54 Mbps according to the IEEE standard. WLANs are spreading rapidly due to cost-effective Access Points (APs) or Access Routers (ARs) and their easy installation.

Saving energy is very crucial in a wireless communication system such as IEEE 802.11 because such a system is not AC-powered but relies on built-in power.

A conventional power-saving mode operation will be described with reference to FIG. 1. Referring to FIG. 1, upon wakeup, a second station (STA 2) sends a null frame to an AP to indicate the wakeup in step 101. In step 103, the AP replies with an ACKnowledgement (ACK) within a Short Inter Frame Space (SIFS). Then the AP sends a data frame to a first station (STA 1) according to its schedule in step 105. STA 1 sends an ACK for the received frame to the AP within the SWFS in step 107. In step 109, the AP sends a data frame to STA 2 according to its schedule. STA 2 then replies with an ACK within the SIFS in step 111.

When STA 2 has a frame to send to the AP, it sends the data frame to the AP in step 113 and the AP then replies with an ACK within the SIFS in step 115. In step 117, the AP sends a data frame to STA 2, as scheduled. STA 2 sends an ACK for the data frame to the AP within the SIFS in step 119. If STA 2 has not received data from the AP for a predetermined period of time, STA 2 sends a null frame with a Power Save (PS) bit set to '1' in a header to the AP and then transitions to a sleep mode.

As described above, even though the power-saving station, STA 2 notifies the AP of its wakeup, the AP sends data frames as scheduled rather than sending data frames to the station with a priority. Hence, a long time is taken for the STA to receive buffered data from the AP. Since no data is received for a predetermined period of time of active-sleep mode transition, the wakeup time is highly unpredictable and much power is wasted. Moreover, as stations access each frame by Carrier Sense Multiple Access/Collision Avoidance (CSMA/CA), transmission overhead is high. Considering that a decision criterion as to a wakeup time for an STA is yet to be specified, the conventional power-saving mode is not viable in practice.

IEEE 802.11 n-based frame aggregation under the standard performs well in terms of power consumption, although developed for the purpose of high throughput. Accordingly, a need exists for a method of solving the conventional problems by utilizing frame aggregation.

SUMMARY OF THE INVENTION

An object of the present invention is to substantially solve at least the above problems and/or disadvantages and to provide at least the advantages below. Accordingly, an object of the present invention is to provide an apparatus and method for reducing the power consumption of an STA in a wireless communication system.

Another object of the present invention is to provide an apparatus and method for enabling an STA to wake up periodically or non-periodically according to service characteristics, to process data transmission and reception at one time, and then to transition to a sleep mode in a wireless communication system.

A further object of the present invention is to provide an apparatus and method for enabling an STA to wake up periodically or non-periodically, taking into account an AP-recommended wakeup time, to process data transmission and reception at one time, and then to transition to a sleep mode in a wireless communication system.

The above objects are achieved by providing a power saving apparatus and method in a wireless communication system.

According to one aspect of the present invention, in an STA device in a wireless communication system, a protocol controller generates a first control information frame indicating wakeup to an AP, upon wakeup from a sleep mode. The protocol controller also generates a third control information frame including a reception duration, upon receipt of a second control information frame including a requested transmission length from the AP. A frame aggregation controller aggregates the third control information frame received from the protocol controller and user data frames to one protocol data unit, and provides the protocol data unit to a physical layer.

According to another aspect of the present invention, in an AP device in a wireless communication system, a buffer buffers transmission frames for sleep-mode STAs. A protocol controller generates a first control information frame including a requested transmission length according to the data within buffered data for one of the STAs, upon wakeup of the STA. The protocol controller also generates a third control information frame for frame aggregation, upon receipt of a second control information frame including a reception duration from the station. A frame aggregation controller aggregates the third control information frame received from the protocol controller and as many frames read from the buffer as transmittable for the reception duration to one protocol data unit, and provides the protocol data unit to a physical layer.

According to a further aspect of the present invention, in a communication method for an STA in a wireless communication system, upon wakeup from a sleep mode, a first control information frame indicating wakeup is sent to an AP. Upon receipt of a second control information frame including a requested transmission length from the AP, it is determined whether the AP has buffered data for the station. In the presence of buffered data for the station in the AP, a third control information frame including a reception duration is sent to the AP. The third control information frame received from the protocol controller and user data frames are aggregated to one protocol data unit and sent to the AP.

According to still another aspect of the present invention, in a communication method for an AP in a wireless communication system, transmission frames for sleep-mode STAs are buffered in a sleep-mode buffer. Upon wakeup of one of the STAs, a first control information frame including a requested transmission length according to the data within buffered data for the station is sent to the STA. A third control information frame for frame aggregation is generated, upon receipt of a second control information frame including a reception duration from the station. The third control information frame received from the protocol controller and as many frames read from the buffer as transmittable for the reception duration are aggregated to one protocol data unit and sent to the STA.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of enabling an STA to wake up periodically or non-periodically and to process data transmission and reception at one time in a wireless communication system.

Figure 1:
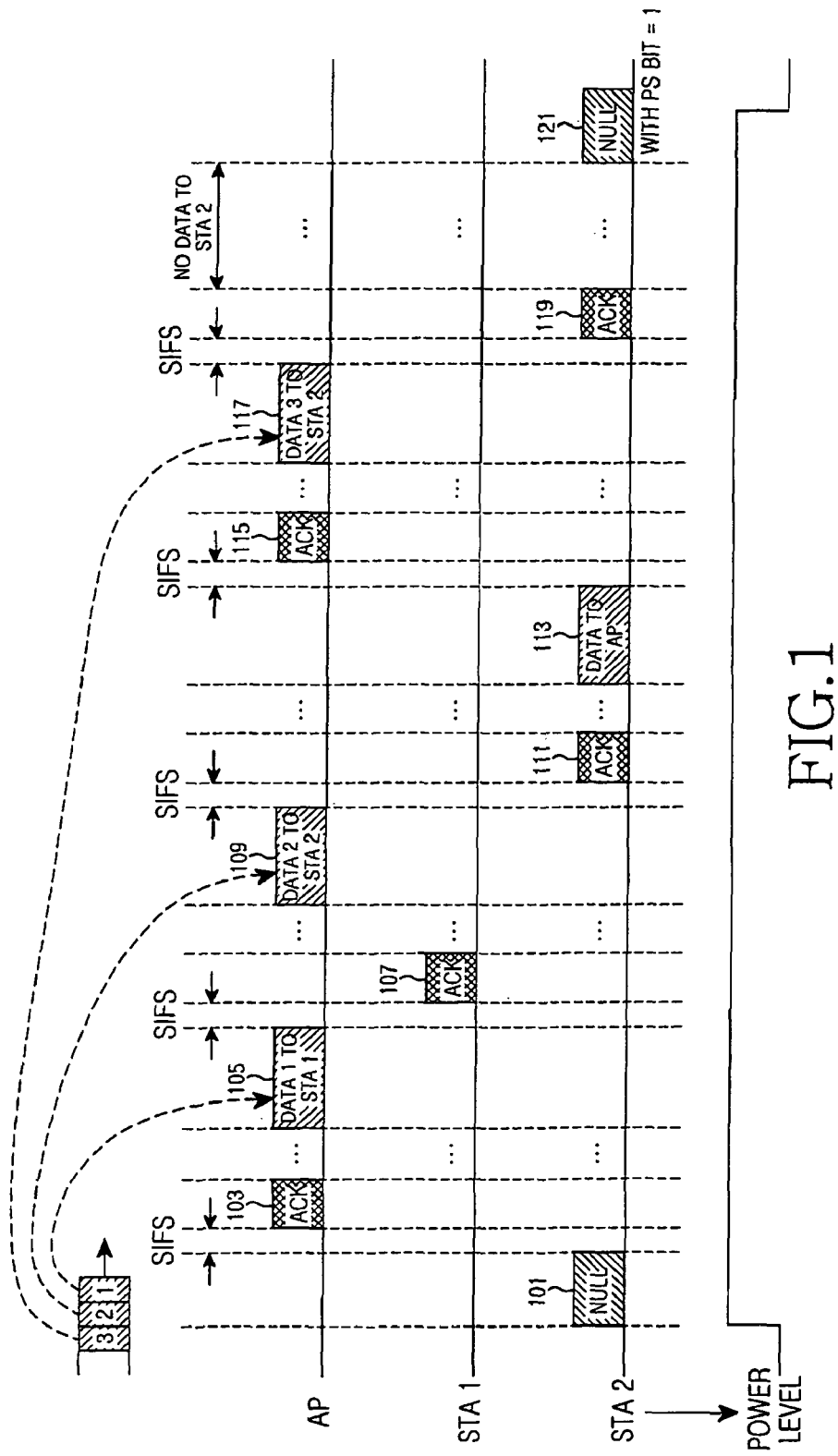
FIG. 1 illustrates a power-saving mode operation in a conventional wireless communication system.
Figure 2:
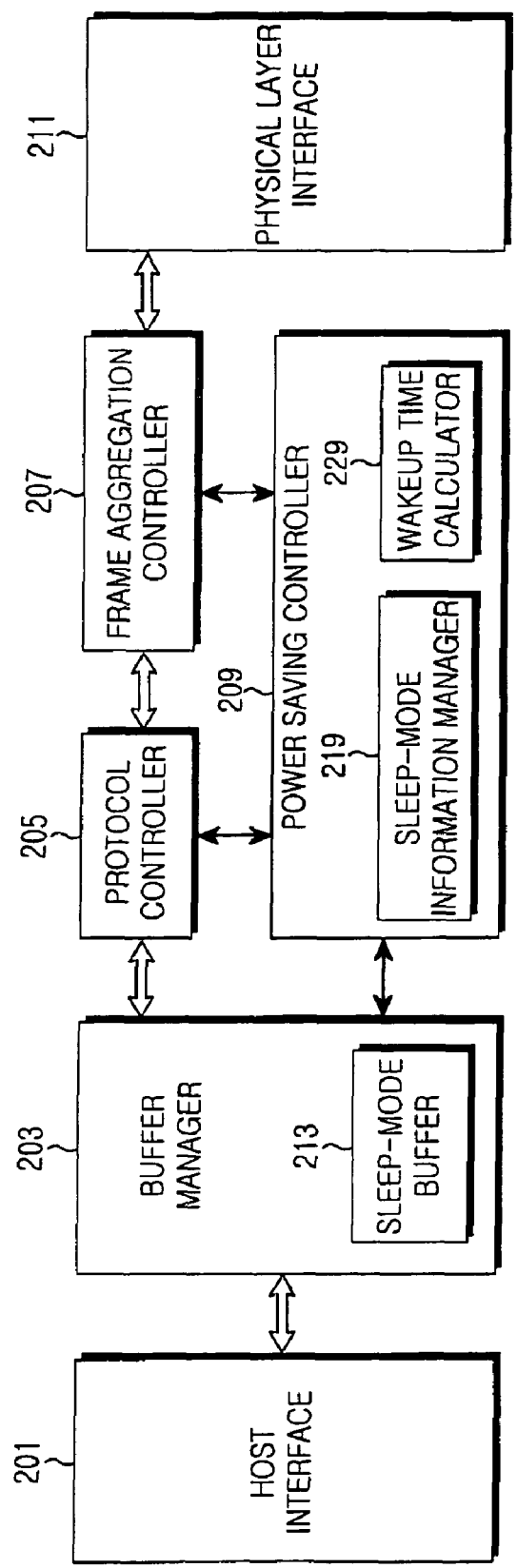
FIG. 2 is a block diagram of an AP in a wireless communication system according to the present invention.

FIG. 2 is a block diagram of an AP in a wireless communication system according to the present invention. Referring to FIG. 2, the AP includes a host interface 201, a buffer manager 203, a protocol controller 205, a frame aggregation controller 207, a power saving controller 209, and a physical layer interface 211.

In operation, the buffer manager 203 communicates with a host via the host interface 201. The buffer manager 203 includes a plurality of transmission and reception buffers (not shown). It further includes a sleep mode buffer 213 for buffering data to sleep-mode STAs according to the present invention. The buffer manager 203 temporarily buffers transmission data destined for the protocol controller 205, received from the host, and reception data destined for the host, received from the protocol controller 205. Particularly, data to be sent to the sleep-mode STAs are buffered in the sleep mode buffer 213.

The protocol controller 205 encapsulates a transmission frame received from the buffer manager 203 according to a predetermined protocol and decapsulates a reception frame received from the frame aggregation controller 207. The protocol controller 205 also transmits/receives a control information frame according to a predetermined protocol. When determining reception of a control information frame in the decapsulation, the protocol controller 205 operates in correspondence with the control information frame. For example, in the case of a control information frame indicating the wakeup of an STA, the protocol controller 205 generates a control information frame in response to the received control information frame and sends it to the STA.

The power saving controller 209 includes a sleep mode information manager 219 for managing information about the sleep-mode STAs (e.g. the amount of buffered data in the buffer 213) and a wakeup time calculator 229 for calculating a wakeup time for each STA, taking into account the status of the STA (e.g. Quality of Service (QoS)) or the amount of downlink traffic for the STA. Upon sensing the wakeup of an STA, the power saving controller 209 provides buffer information associated with the STA to the protocol controller 205, and when requested, calculates the next wakeup time for the STA and provides it to the protocol controller 205. Control information containing the wakeup time and other transmission frames are aggregated in the frame aggregation controller 207 and then sent to the STA.

The frame aggregation controller 207 communicates with a physical layer via the physical layer interface 211. The frame aggregation controller 207 aggregates encapsulated transmission frames received from the protocol controller 205 into one Physical Protocol Data Unit (PPDU) and provides the PPDU to the physical layer interface 211. It also segregates an aggregation PPDU received via the physical layer interface 211 into frames and provides the frames to the protocol controller 205.

While the protocol controller 205 and the frame aggregation controller 207 are separately configured in the embodiment illustrated in FIG. 2, they may be incorporated into one module. In other words, the protocol controller would perform frame aggregation as one of its functions. Also, the AP can be so configured that some protocol-related operations of the protocol controller 205 (e.g. control information frame transmission and reception regarding frame aggregation) are carried out by the frame aggregation controller.

Figure 3:
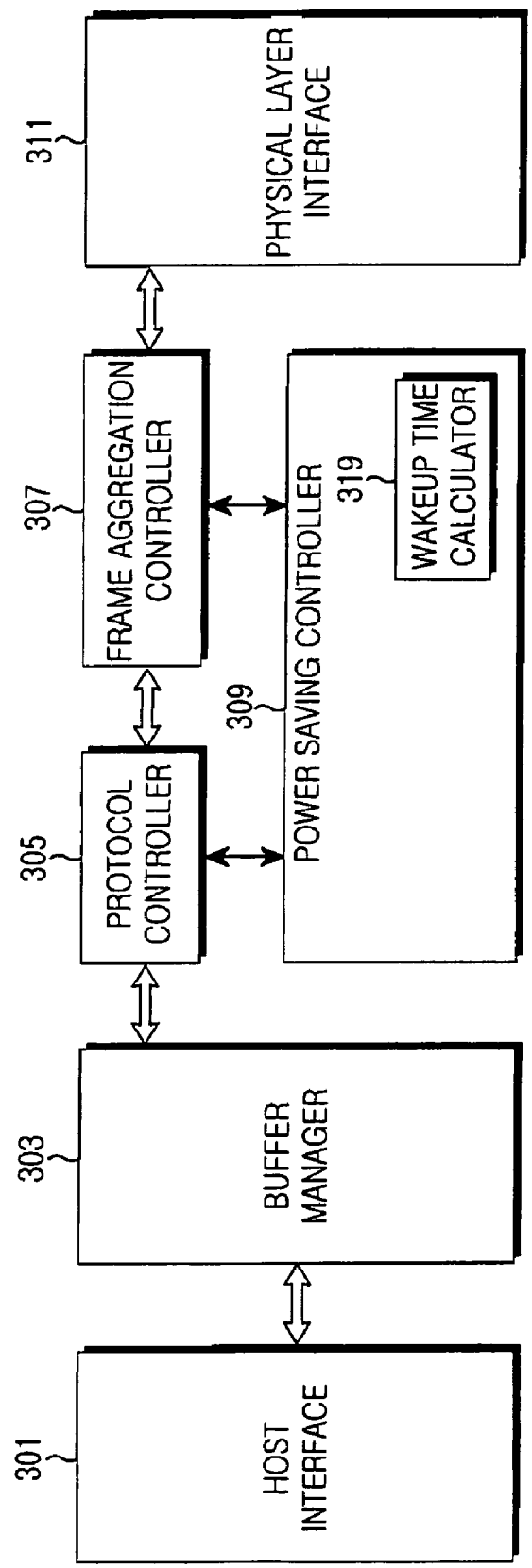
FIG. 3 is a block diagram of an STA in the wireless communication system according to the present invention.

FIG. 3 is a block diagram of an STA in the wireless communication system according to the present invention. Referring to FIG. 3, the STA includes a host interface 301, a buffer manager 303, a protocol controller 305, a frame aggregation controller 307, a power saving controller 309, and a physical layer interface 311.

In operation, the buffer manager 303 communicates with a host via the host interface 301. The buffer manager 303 includes a plurality of transmission and reception buffers (not shown). The buffer manager 303 also temporarily buffers transmission data destined for the protocol controller 305, received from the host, and reception data destined for the host, received from the protocol controller 305.

The protocol controller 305 encapsulates a transmission frame received from the buffer manager 303 according to a predetermined protocol, decapsulates a reception frame received from the frame aggregation controller 307, and outputs the encapsulated frame and the decapsulated frame to the frame aggregation controller 307 and the buffer manager 303, respectively. The protocol controller 305 also transmits/receives a control information frame according to a predetermined protocol. When determining reception of a control information frame from the AP, the protocol controller 305 generates control information indicating a reception-available period of time and sends it to the AP.

The power saving controller 309 includes a wakeup time calculator 319 for calculating a wakeup time, taking into account the status of the STA (e.g. QoS), the amount of traffic, and a wakeup time recommended by the AP. Being informed of transition to a sleep mode by the protocol controller 305, the power saving controller 309 performs an operation or a control operation for transitioning the STA to the sleep mode. When it is time to wake up, the power saving controller 309 operates to transition the STA to an active mode. For instance, upon wakeup, the power saving controller 309 notifies the protocol controller 305 of the wakeup so that the protocol controller 305 can send a wakeup frame to the AP.

The frame aggregation controller 307 communicates with a physical layer via the physical layer interface 311. The frame aggregation controller 307 aggregates encapsulated transmission frames received from the protocol controller 205 into one PPDU and provides the PPDU to the physical layer interface 311. The frame aggregation controller 307 also segregates an aggregation PPDU received via the physical layer interface 311 into frames and provides them to the protocol controller 305.

While the protocol controller 305 and the frame aggregation controller 307 are separately configured in the embodiment illustrated in FIG. 3, they may be incorporated into one module. In other words, the protocol controller may perform frame aggregation as one of its functions. Also, the STA can be so configured that some protocol-related operations of the protocol controller 305 (e.g. control information frame transmission and reception associated with frame aggregation) are carried out by the frame aggregation controller.

The present invention will be described below separately as one embodiment applicable to any system and another embodiment applicable to 802.11 Task Group 'n' Synchronization (TGn Sync) only.

Figure 4:
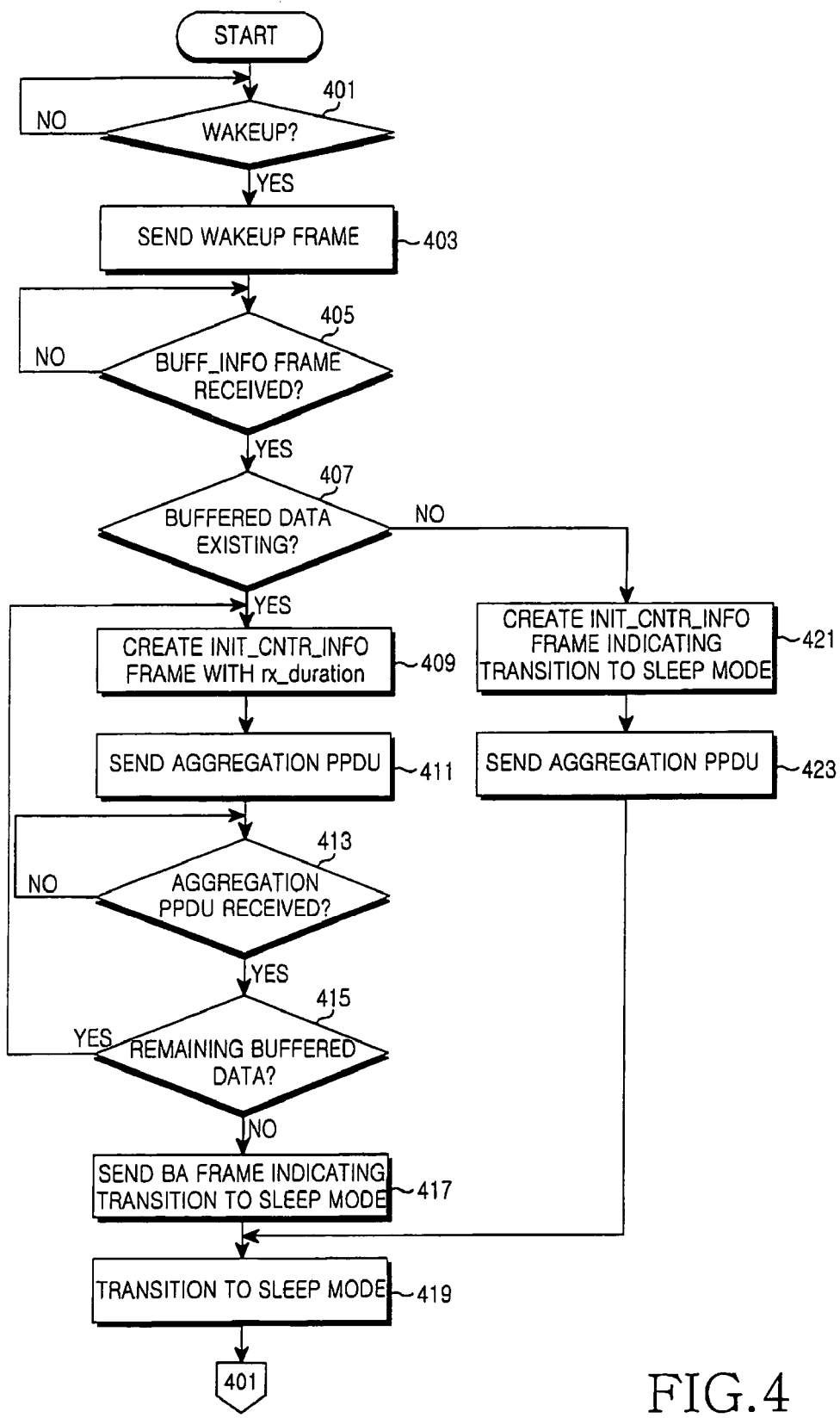
FIG. 4 is a flowchart illustrating a power-saving mode operation in the STA in the wireless communication system according to a first embodiment of the present invention.

FIG. 4 is a flowchart illustrating a power-saving mode operation in the STA in the wireless communication system according to the first embodiment of the present invention. Referring to FIG. 4, the STA checks whether it has woken up from a sleep mode in step 401. Upon wakeup, the STA creates a wakeup frame and sends it to the AP in step 403. In step 405, the STA then monitors receipt of a buffer information (BUFF_INFO) frame from the AP. The BUFF_INFO frame contains requested transmission duration information (req_tx_length).

Upon receipt of the BUFF_INFO frame, the STA determines whether the AP has buffered data for the STA by analyzing req_tx_length, that is, whether the AP has requested a transmission duration in step 407. If the AP has buffered data, the STA generates an initiator control information (INIT_CNTR_INFO) frame containing reception duration information (rx_duration) in step 409. The STA aggregates the INIT_CNTR_INFO frame and buffered transmission frames to one PPDU and sends the PPDU to the AP in step 411.

After sending the aggregation PPDU, the STA monitors receipt of an aggregation PPDU from the AP in step 413. Upon receipt of an aggregation PPDU, the STA determines whether the AP still has buffered data for the STA by analyzing a responder control information (RESP_CNTR_INFO) frame in step 415. If the AP still has buffered data, the STA returns to step 409. In the absence of buffered data for the STA in the AP, the STA sends a Block ACK (BA) to the AP, notifying of transition to the sleep mode in step 417. The PS bit of the header in the BA fame is set to '1'. The STA transitions to the sleep mode in step 419 and returns to step 401.

On the other hand, in the absence of buffered data for the STA in the AP in step 407, the STA generates an INIT_CNTR_INFO frame indicating transition to the sleep mode in step 421. The PS bit of the INIT_CNTR_INFO frame is set to '1'. In step 423, the STA aggregates the INIT_CNTR_INFO frame and buffered transmission frames to one PPDU and sends it to the AP. Then the STA proceeds to step 419.

As described above, an aggregation PPDU received from the AP has an RESP_CNTR_INFO frame for aggregation, user data frames, and a BA frame aggregated therein. In the absence of any further buffered data for the STA in the AP, the AP may set a recommended next wakeup time (rec_next_wakeup_time) in the RESP_CNTL_INFO frame, and the STA may determine the next wakeup time taking into rec_next_wakeup_time.

Figure 5:
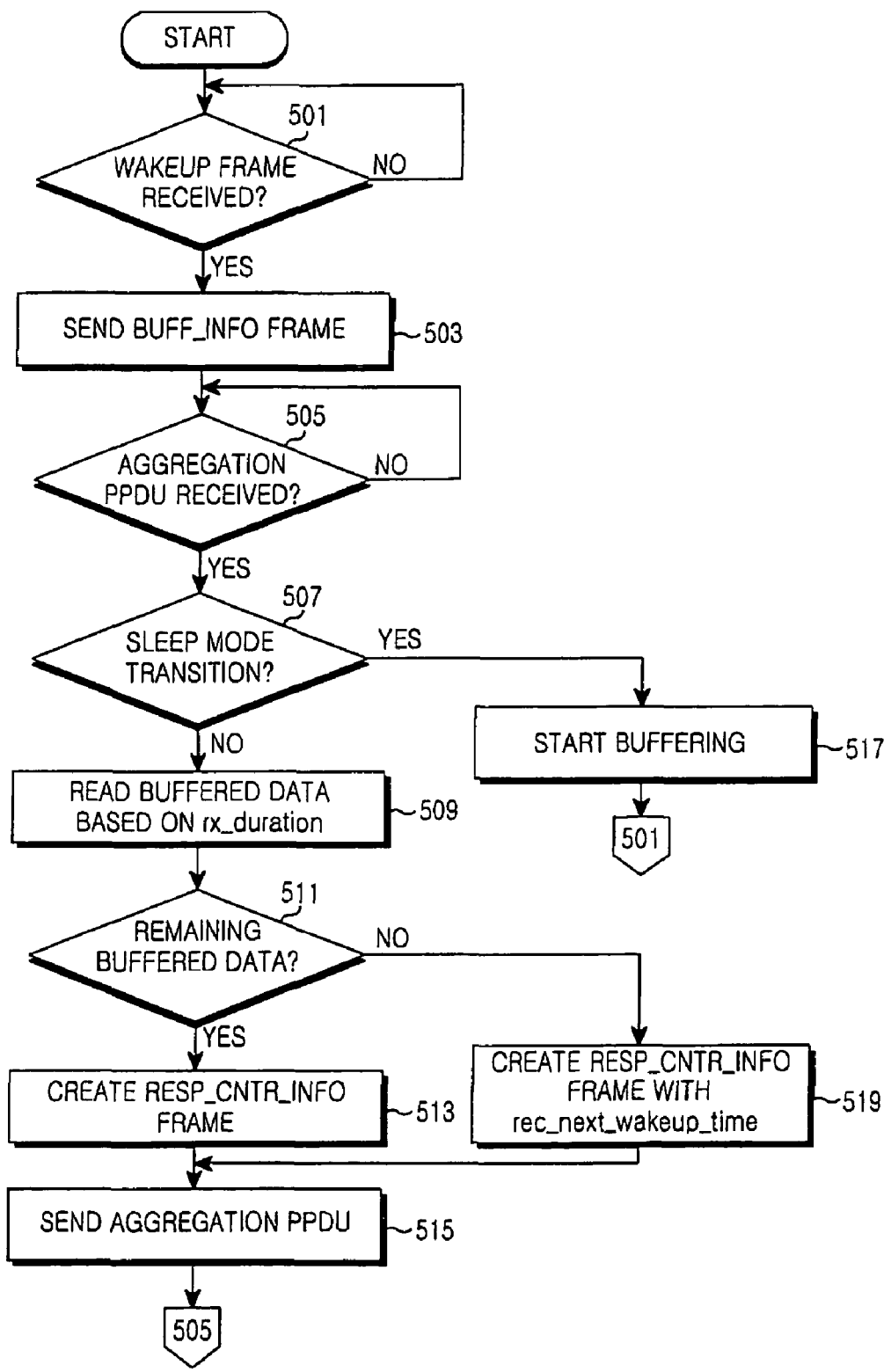
FIG. 5 is a flowchart illustrating a power-saving mode operation in the AP in the wireless communication system according to the first embodiment of the present invention.

FIG. 5 is a flowchart illustrating a power-saving mode operation in the AP in the wireless communication system according to the first embodiment of the present invention. Referring to FIG. 5, the AP monitors receipt of a wakeup frame from one of sleep-mode STAs in step 501. Upon receipt of a wakeup frame, the AP calculates req_tx_length based on the amount of buffered data for the STA and sends a BUFF_INFO frame including req_tx_length to the STA in step 503.

After sending the BUFF_INFO frame, the AP monitors receipt of an aggregation PPDU from the STA in step 505. The aggregation PPDU may contain an INIT_CNTR_INFO frame and user data frames. Upon receipt of an aggregation PPDU, the AP determines whether the STA has transitioned to the sleep mode by analyzing the INIT_CNTR_INFOR frame in step 507. That is, it is determined whether the PS bit of the INIT_CNTR_INFO frame is set to '1'.

If the STA is in the active mode (PS=0), the AP checks rx_duration in the INIT_CNTR_INFO frame and reads as much buffered data for the STA as does not exceed rx_duration in step 509 and determines whether buffered data still remains for the STA in step 511.

In the presence of remaining buffered data in the sleep-mode buffer, the AP calculates req_tx_length based on the amount of the buffered data and generates an RESP_CNTR_INFO frame including req tx length (or buffer information) in step 513. The AP aggregates the RESP_CNTR_INFO frame, the read transmission frames, and a BA frame to a PPDU and sends the aggregation PPDU to the STA in step 515. Then the AP returns to step 505.

In the absence of remaining buffered data for the STA, the AP calculates rec_next_wakeup_time for the STA, taking into account the statuses of STAs (e.g. QoS) and the amount of traffic and generates an RESP_CNTR_INFO frame containing rec_next_wakeup_time in step 519 and then proceeds to step 515.

Meanwhile, if it is determined that the STA has transitioned to the sleep mode in step 507, the AP starts to buffer data for the STA in the sleep-mode buffer in step 517 and returns to step 501.

In accordance with the first embodiment of the present invention as described above, the control information frames contain the following information. The BUFF_INFO frame indicates the amount of buffered data to the STA, including req_tx_length. The INIT_CNTR_INFO frame includes rx_duration, for frame aggregation. The RESP_CNTR_INFO frame is a response to the INIT_CNTR_INFO frame, and includes req_tx_length or rec_next_wakeup_time.

Figure 6:
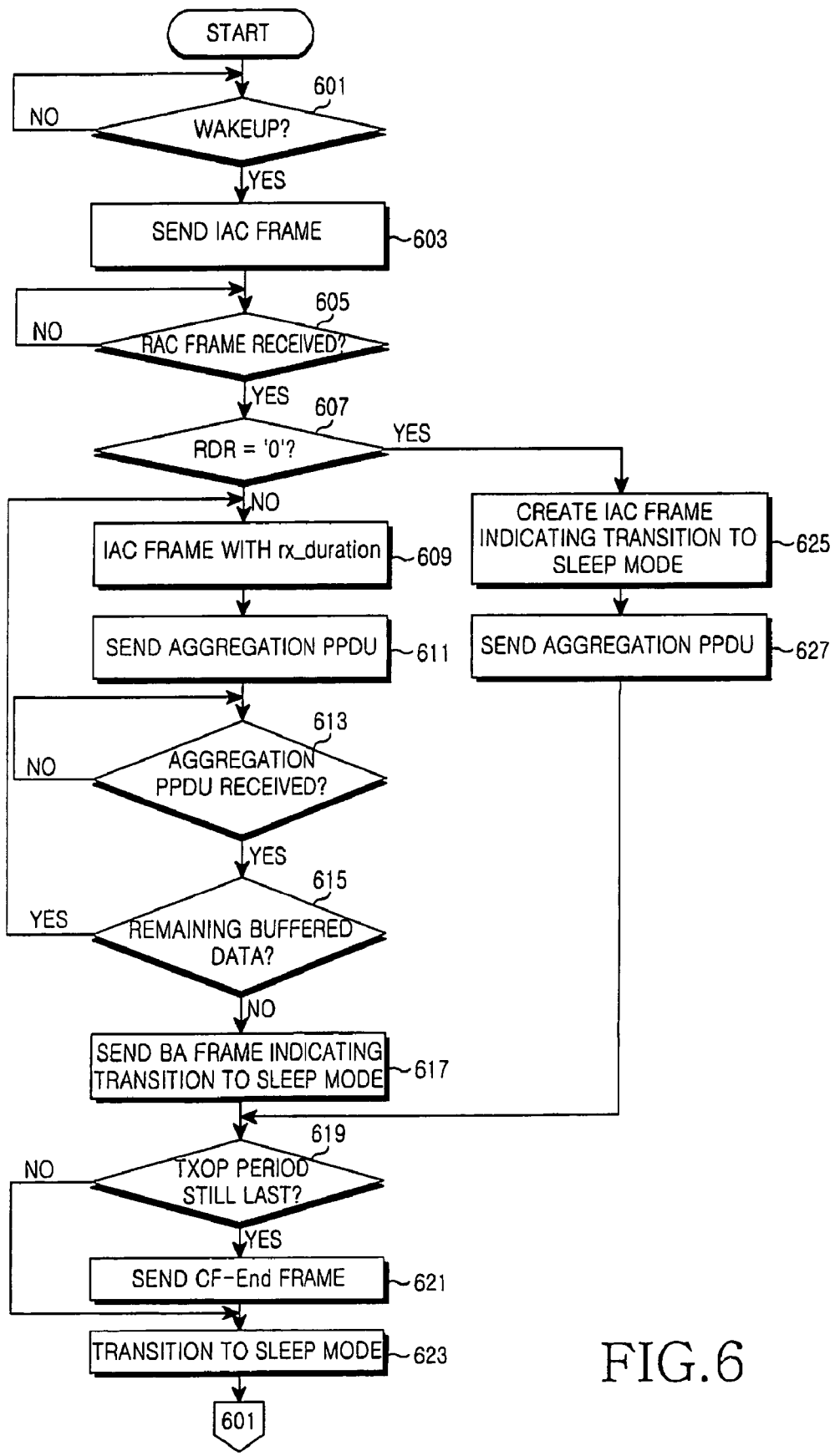
FIG. 6 is a flowchart illustrating a power-saving mode operation in the STA in the wireless communication system according to a second embodiment of the present invention.

FIG. 6 is a flowchart illustrating a power-saving mode operation in the STA in the wireless communication system according to the second embodiment of the present invention. As stated earlier, the second embodiment is applicable to 802.11 TGn Sync.

Referring to FIG. 6, the STA checks whether it has woken up from the sleep mode in step 601. Upon wakeup, the STA creates an Initiator Aggregation Control (IAC) frame and sends it to the AP in step 603. The IAC frame contains a Reverse Direction Limit (RDL) indicating a transmission duration limit for the AP. The reverse direction is from the responder to the initiator. In step 605, the STA then monitors receipt of an RAC frame from the AP. The RAC frame contains a Reverse Direction Request (RDR) Size indicating a transmission duration requested by the AP.

Upon receipt of the RAC frame, the STA determines whether the AP has buffered data for the STA by analyzing the RDR, that is, whether the AP has requested a transmission duration in step 607. If the AP has requested the transmission duration, the STA generates an IAC frame containing a Reverse Direction Grant (RDG) in step 609. In step 611, the STA aggregates the IAC frame and buffered transmission frames to one PPDU and sends the aggregation PPDU to the AP.

After sending the aggregation PPDU, the STA monitors receipt of an aggregation PPDU from the AP in step 613. Upon receipt of an aggregation PPDU, the STA determines whether the AP still has buffered data for the STA by analyzing an RAC frame in the aggregation PPDU in step 615. If the RDR Size is '0' or the RDR bits of an RAC mask is '0', the STA determines that no buffered data for the STA exists in the AP.

In the presence of remaining buffered data for the STA, the STA returns to step 609. In the absence of buffered data for the STA in the AP, the STA sends a BA frame to the AP, notifying the AP of transition to the sleep mode in step 617. The PS bit of the header in the BA frame is set to '1'.

In step 619, the STA checks whether a TX Opportunity (TXOP) period still lasts. If the TXOP period has expired, the STA immediately transitions to the sleep mode in step 623 and returns to step 601. If the TXOP period still lasts, the STA sends a Contention-Free End (CF-End) frame in step 621 and proceeds to step 623.

On the other hand, in the absence of buffered data for the STA in the AP in step 607, the STA generates an IAC frame indicating transition to the sleep mode in step 625. Thus, the PS bit of the IAC frame is set to '1'. In step 627, the STA aggregates the IAC frame and buffered transmission frames to one PPDU and sends it to the AP. Then the STA proceeds to step 619.

As described above, an aggregation PPDU received from the AP has an IAC, user data frames, and a BA frame aggregated therein. In the absence of any further buffered data for the STA in the AP, the AP may set a Recommended Wakeup Interval (RWI) in the IAC frame, and the STA may determine the next wakeup time taking into the RWI.

Figure 7:
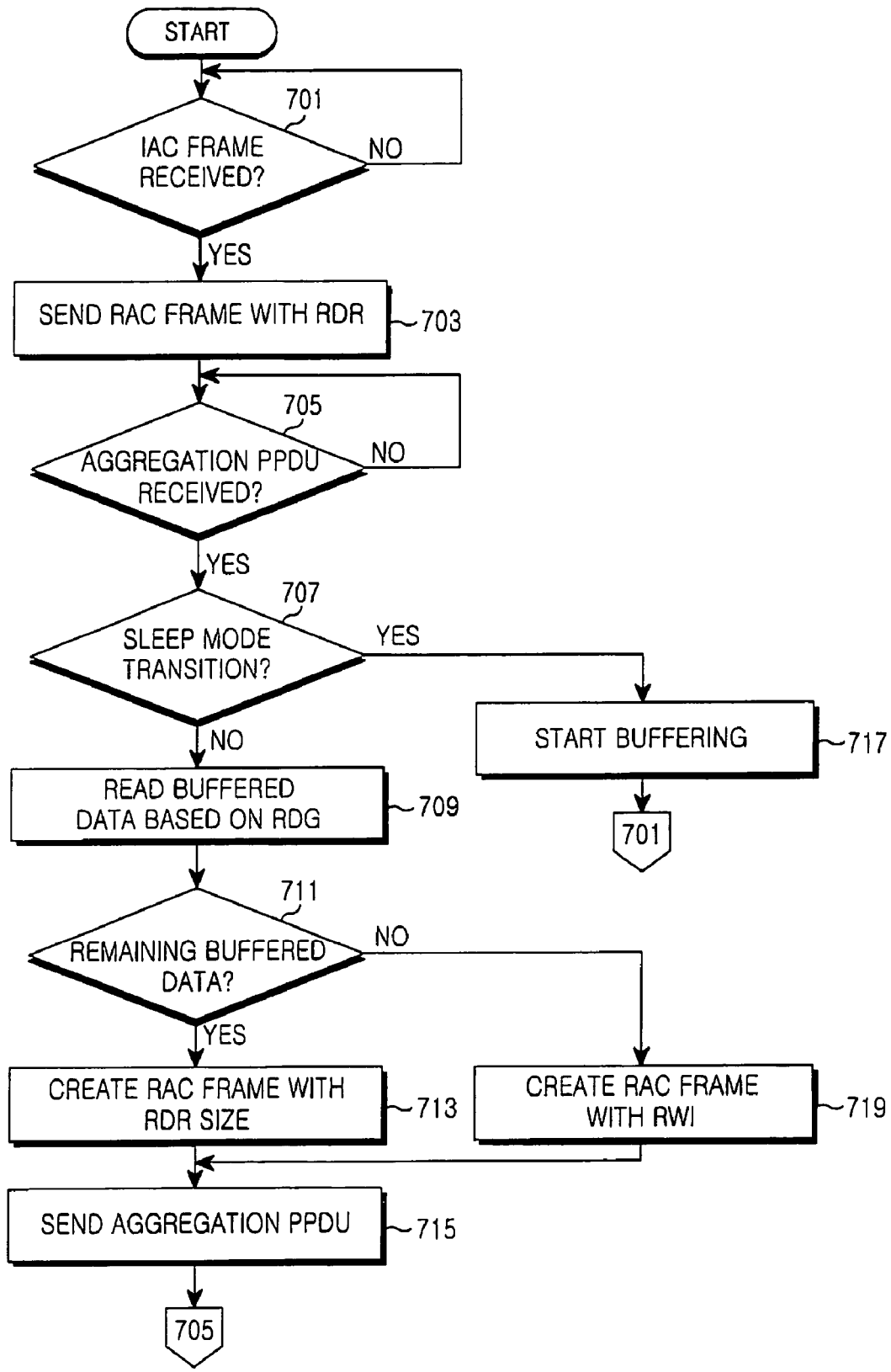
FIG. 7 is a flowchart illustrating a power-saving mode operation in the AP in the wireless communication system according to the second embodiment of the present invention.

FIG. 7 is a flowchart illustrating a power-saving mode operation in the AP in the wireless communication system according to the second embodiment of the present invention. Referring to FIG. 7, the AP monitors receipt of an IAC frame indicating wakeup from one of sleep-mode STAs in step 701. Upon receipt of an IAC frame, the AP calculates an RDR size based on the amount of buffered data for the STA and sends an RAC frame including the RDR Size to the STA in step 703.

After sending the RAC frame, the AP monitors receipt of an aggregation PPDU from the STA in step 705. The aggregation PPDU may contain an IAC frame and user data frames. Upon receipt of an aggregation PPDU, the AP determines whether the STA has transitioned to the sleep mode by analyzing the IAC frame in the aggregation PPDU in step 707. That is, it is determined whether the PS bit of the IAC frame is set to '1'.

If the STA is in the active mode (PS=0), the AP checks an RDG in the IAC frame and reads as much buffered data for the STA as does not exceed a duration indicated by the RDR in step 709 and determines whether buffered data still remains for the STA in step 711.

In the presence of remaining buffered data in the sleep-mode buffer, the AP calculates an RDR size based on the amount of the buffered data and generates an RAC frame including the RDR Size in step 713. The AP aggregates the RAC frame, the read transmission frames, and a BA frame to a PPDU and sends the aggregation PPDU to the STA in step 715. Then the AP returns to step 705.

In the absence of remaining buffered data for the STA, the AP calculates an RWI for the STA, taking into account the statuses of STAs (e.g. QoS) and the amount of traffic and generates an RAS frame containing the RWI in step 719 and then proceeds to step 715.

Meanwhile, if determining that the STA has transitioned to the sleep mode in step 707, the AP starts to buffer data for the STA in the sleep-mode buffer in step 717 and returns to step 701.

In accordance with the second embodiment of the present invention as described above, the control information frames contain the following information.

Figure 12:
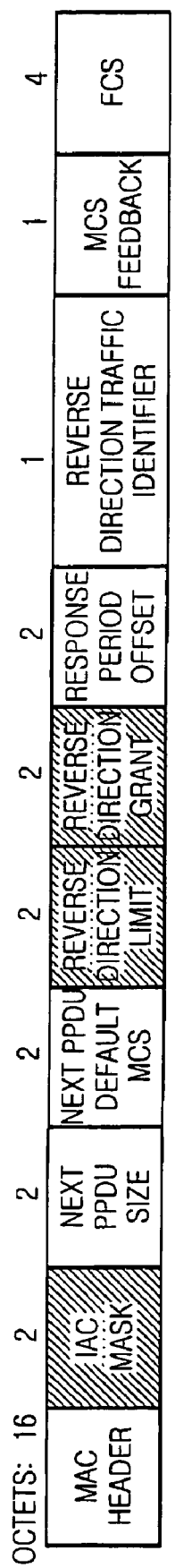
FIG. 12 illustrates the structure of an Initiator Aggregation Control (IAC) frame according to the present invention.

FIG. 12 illustrates the structure of an IAC frame according to the present invention. The IAC frame is a control information frame for aggregated data sent from an STA that has taken a TXOP. The IAC frame is set at the start of an aggregation PPDU.

Referring to FIG. 12, the IAC frame includes a Media Access Control (MAC) Header, an IAC mask, a Next PPDU Size, a Next PPDU Default Modulation and Coding Scheme (MCS), a Reverse Direction Limit, a Reverse Direction Grant, a Response Period Offset, a Reverse Direction Traffic Identifier, an MCS Feedback and a Frame Check Sequence (FCS). Significant fields according to the present invention are shaded.

The IAC Mask is a field identifying information included in the IAC frame. The Next PPDU Size indicates the size of the next PPDU. The Next PPDU Default MCS indicates an MCS for the next PPDU. The Reverse Direction Limit indicates a reverse transmission duration limit. The responder requests a reverse transmission duration based on the Reverse Direction Limit. The Reverse Direction Grant is a field that provides a reverse transmission duration to be assigned to the responder. The Response Period Offset is meaningful when the RDG is sent. It indicates a delay for reverse transmission. The Reverse Direction Traffic Identifier indicates an Access Category (AC) available for reverse direction. The MCS Feedback is a field in which a recommended MCS level is written.

Figure 13:
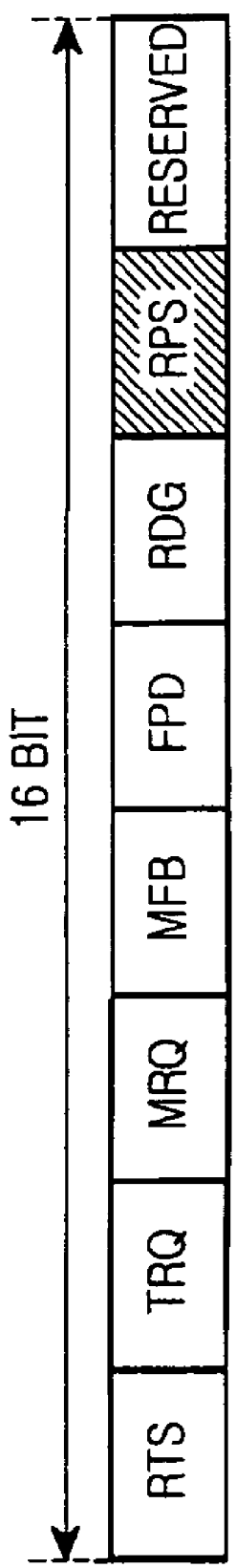
FIG. 13 illustrates the structure of an IAC mask according to the present invention.

The IAC MASK is illustrated in detail in FIG. 13. Referring to FIG. 13, the IAC MASK includes an RTS (Request to Send), TRQ (Training Request), an MRQ (MCS Request), an MFB (MCS Feedback), an FPD (Following Packet Descriptor), an RDG (Reverse Direction Grant), a RPS (Recommended Power Saving), and a Reserved. If the RTS is '1', this implies a request to send. If the TRQ is '1', it requests the train of a channel used in Multiple Input Multiple Output (MIMO) with implicit feedback. If the MRQ is '1', it indicates a request for MCS feedback. If the MFB is '1', it indicates use of closed-loop channel adaptation. If the FPD is '1', it means that the next PPDU duration is to be calculated using "Next PPDU Size" and "Next PPDU Default MCS." If the RDG is '1', it implies that the RDG is provided. If the RPS is '1', it requests recommendation of the next wakeup time to the AP. This RPS field is added according to the present invention.

Figure 14:
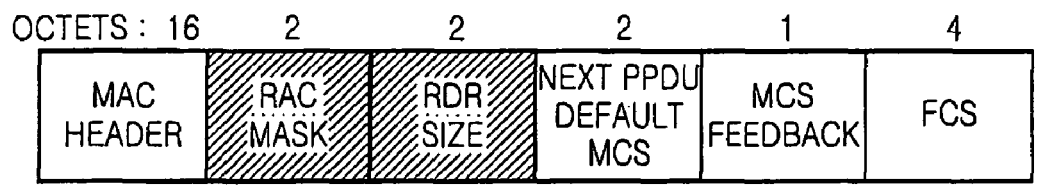
FIG. 14 illustrates the structure of a Responder Aggregation Control (RAC) frame according to the present invention.

FIG. 14 illustrates the structure of an RAC frame according to the present invention. The RAC frame is a control information frame for frame aggregation that the AP sends as a response for a received IAC frame. The AP notifies of the presence of transmission data by the RAC frame. Similarly to the IAC frame, the RAC frame is included at the start of a reverse aggregation PPDU.

Referring to FIG. 14, the RAC frame includes a MAC Header, an RAC Mask, an RDR Size, a Next PPDU Default MCS, an MCS Feedback, and an FCS. The RAC Mask identifies information included in the RAC frame. The RDR Size indicates a requested transmission duration determined within an RDL. The Next PPDU Default MCS indicates an MCS for the next PPDU. The MCS Feedback indicates a recommended MCS level.

Figure 15:
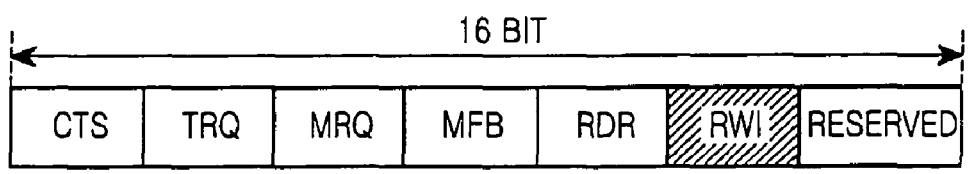
FIG. 15 illustrates the structure of an RAC mask according to the present invention.

The RAC Mask is illustrated in detail in FIG. 15. Referring to FIG. 15, the RAC MASK includes a CTS (Clear to Send), TRQ (Training Request), an MRQ (MCS Request), an MFB (MCS Feedback), an RDR (Reverse Direction Request), an RWI (Recommended Wakeup Interval), and a Reserved. If the CTS is '1', this implies a channel is clear. If the TRQ is '1', it requests the train of a channel used in MIMO with implicit feedback. If the MRQ is '1', it indicates a request for MCS feedback. If the MFB is '1', it indicates use of closed-loop channel adaptation. If the RDR is '1', it indicates provisioning of an RDR size. If the RWI is '1', it means that the next wakeup interval is provided. This RWI field is added according to the present invention.

RDR-RWI combinations are interpreted as follows:
RDR:1 RWI:0→RDR size given;
RDR:0 RWI:1→RWI given;
RDR:0 RWI:0→neither RDR nor RWI given; and
RDR:1 RWI:1→not defined.

As described above, if the RWI bit is '1', the RDR Size is interpreted as a recommended wakeup interval. The STA decides the next wakeup time based on this value.

The embodiments of the present invention will be described separately depending on whether wakeup is recommended.

Figure 8:
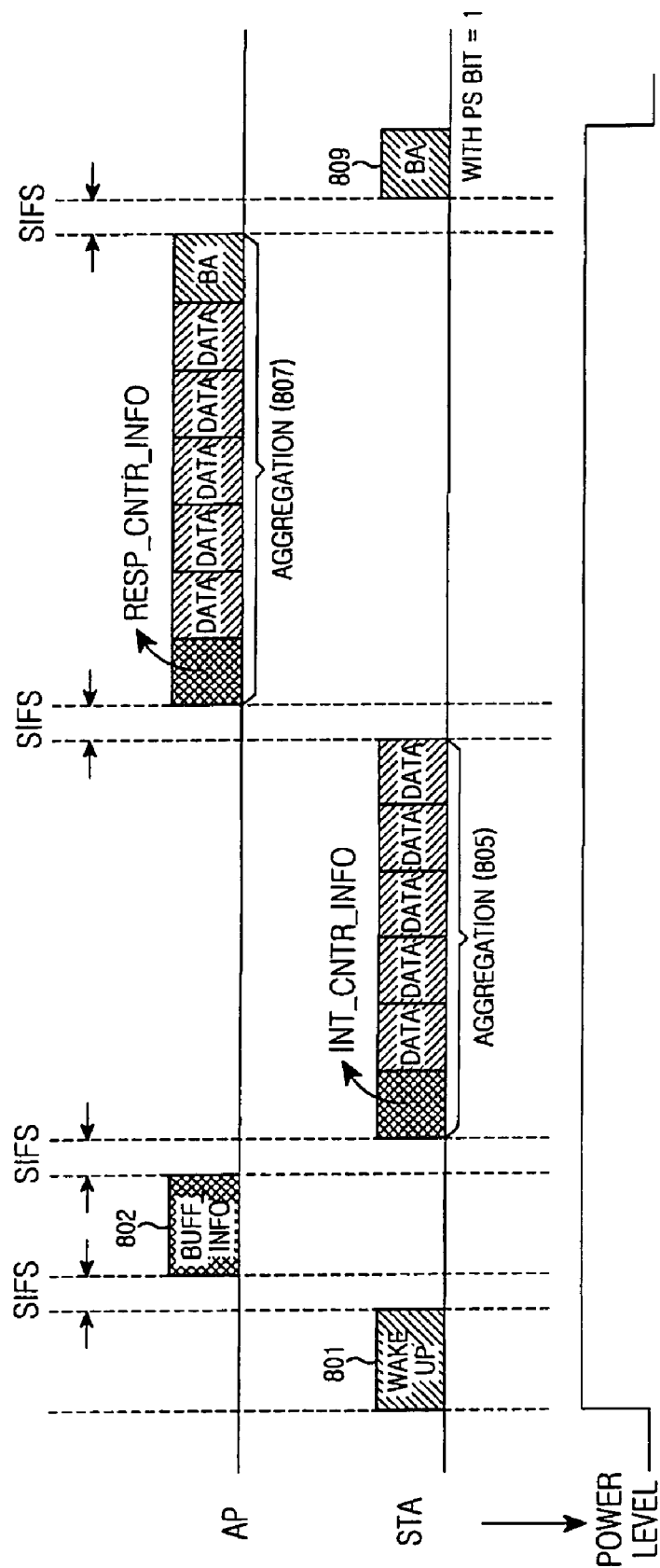
FIG. 8 is a diagram illustrating a signal exchange operation between the STA and the AP when a wakeup time is not recommended in the wireless communication system according to the first embodiment of the present invention.

FIG. 8 is a diagram illustrating a signal exchange operation between the STA and the AP, particularly when the AP does not recommend a wakeup time in the wireless communication system according to the first embodiment of the present invention. Referring to FIG. 8, the STA sends a wakeup frame to the AP, notifying of the wakeup in step 801. Then the AP replies with a BUFF_INFO frame within an SIFS in step 803. The BUFF_INFO frame contains req_tx_length required for frame aggregation.

In step 805, the STA creates an INIT_CNTR_INFO frame in response to the BUFF_INFO frame, aggregates the INIT_CNTR_INFO frame and transmission frames to one PPDU, and sends it within the SIFS to the AP. If buffered data for the STA exists in the AP, the INIT_CNTR_INFO frame contains rx_duration.

The AP creates an RESP_CNTR_INFO frame for the INIT_CNTTR_INFO frame, aggregates the RESP_CNTR_INFO frame, transmission frames transmittable for rx_duration, and a BA frame to one PPDU, and sends it within the SIFS to the STA in step 807. If the AP does not have further data for the STA, req_tx_length is set to '0'.

Upon receipt of the aggregation PPDU, the STA sends a BA frame for the aggregation PPDU to the AP within the SWFS in step 809. If the STA determines the absence of further data to be received from the AP by the RESP_CNTR_INFO frame, the STA notifies the AP of transition to the sleep mode by setting the PS bit of the header in the BA frame to '1'.

As described above, the AP does not recommend a wakeup time in the illustrated case of FIG. 8. Thus, the STA wakes up periodically or non-periodically according to its own decision.

Figure 9:
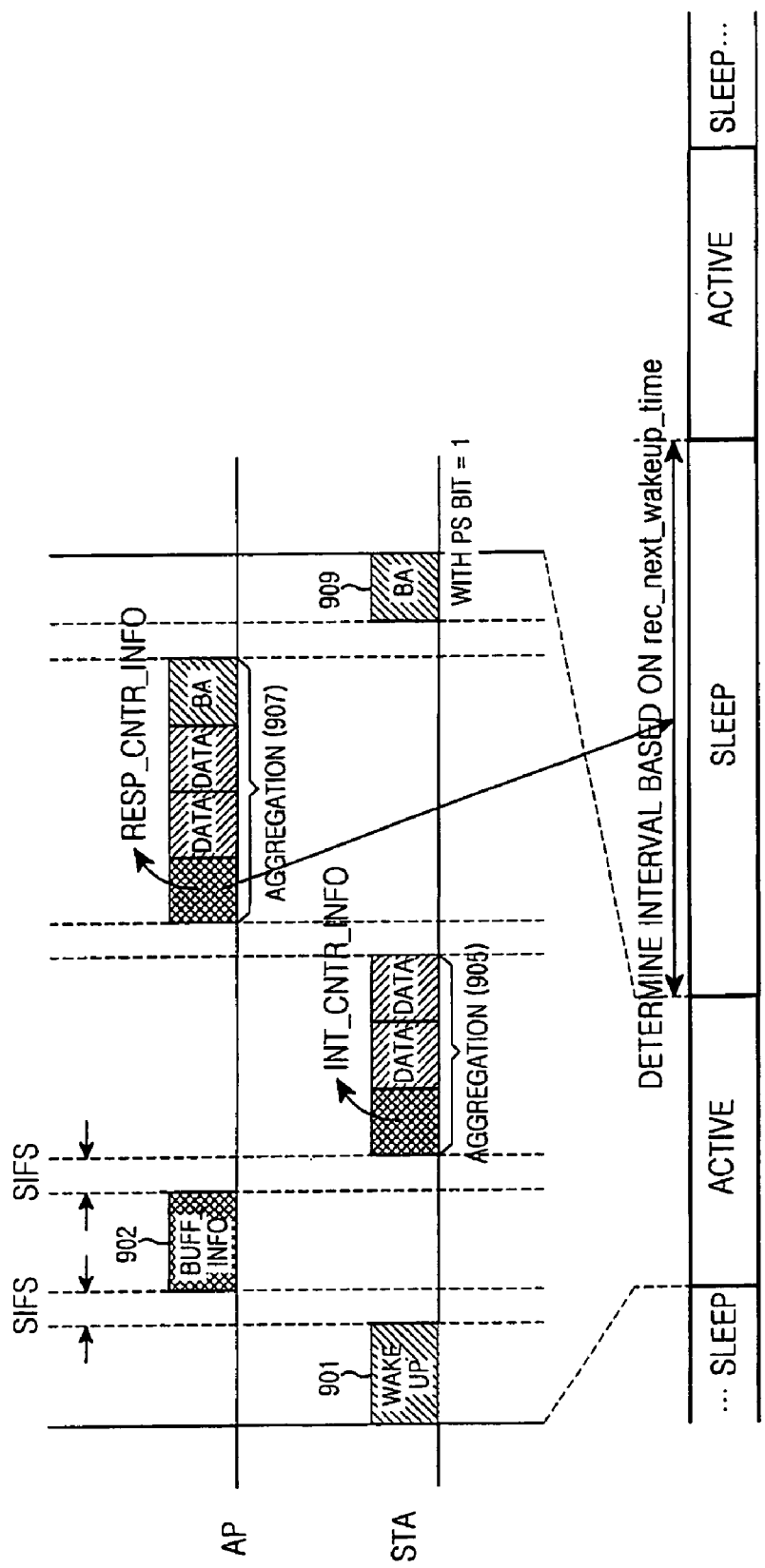
FIG. 9 is a diagram illustrating a signal exchange operation between the STA and the AP when a wakeup time is recommended in the wireless communication system according to the first embodiment of the present invention.

FIG. 9 is a diagram illustrating a signal exchange operation between the STA and the AP, particularly when the AP recommends a wakeup time in the wireless communication system according to the first embodiment of the present invention. Referring to FIG. 9, steps 901 through 905 are performed in the same manner as illustrated in FIG. 8. In step 907, the AP creates an RESP_CNTR_INFO frame for a INIT_CNTR_INFO frame received from the STA, aggregates the RESP_CNTR_INFO frame, transmission frames transmittable for rx_duration, and a BA frame to one PPDU, and sends it within the SIFS to the STA. If the AP does not have further data for the STA, req_tx_length is set to '0' and the next wakeup time is set as rec_next_wakeup_time.

Upon receipt of the aggregation PPDU, the STA sends a BA frame for the aggregation PPDU to the AP within the SIFS in step 909. If the STA determines the absence of further data to be received from the AP by the RESP_CNTR_INFO frame, the STA notifies the AP of transition to the sleep mode by setting the PS bit of the header in the BA frame to '1'. At the same time, the STA determines a sleep interval based on rec_next_wakeup_time set in the RESP_CNTR_INFO frame, as illustrated in FIG. 9.

Figure 10:
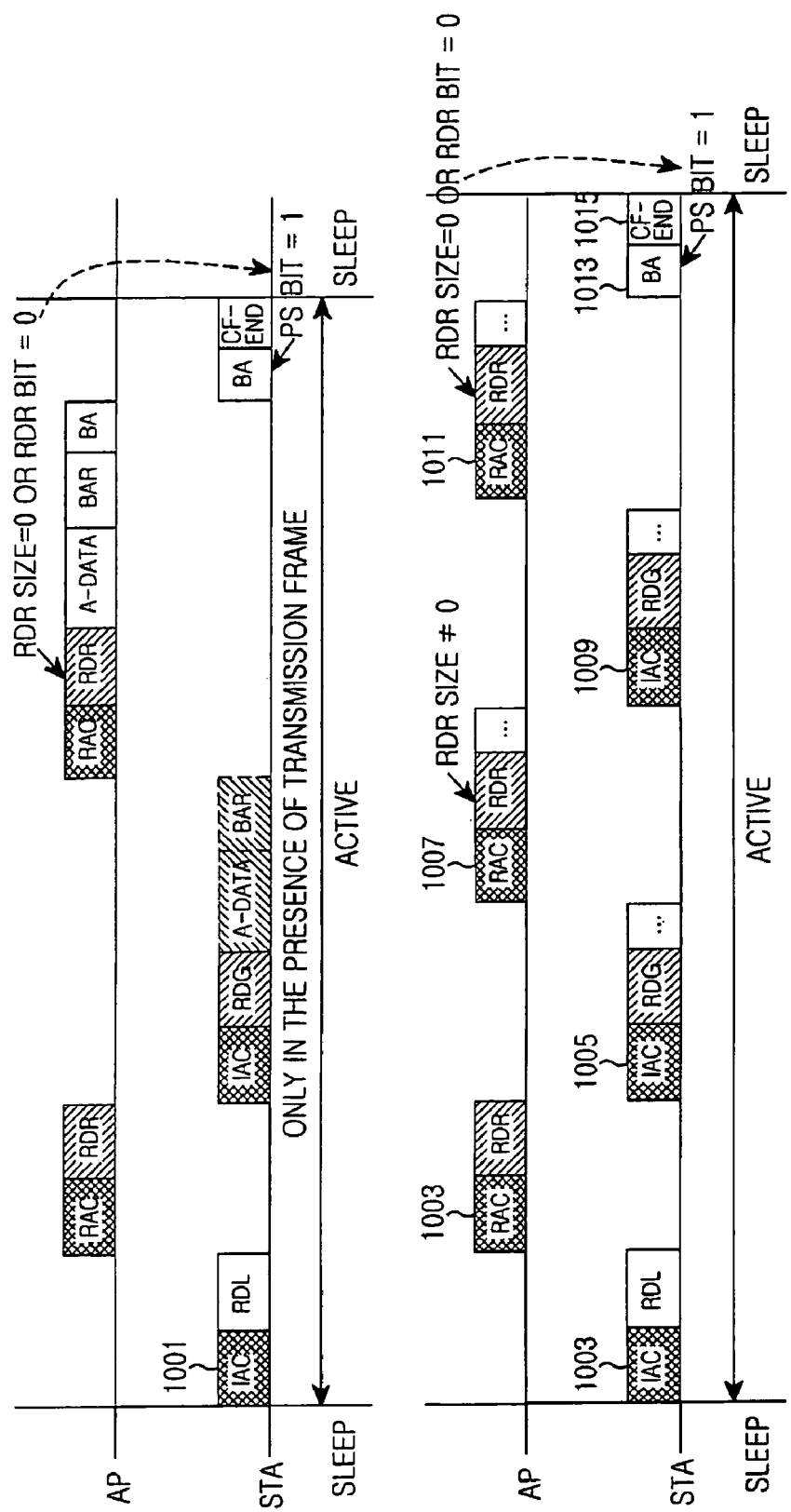
FIG. 10 is a diagram illustrating a signal exchange operation between the STA and the AP when a wakeup time is not recommended in the wireless communication system according to the second embodiment of the present invention.

FIG. 10 is a diagram illustrating a signal exchange operation between the STA and the AP, particularly when the AP does not recommend a wakeup time in the wireless communication system according to the second embodiment of the present invention.

Referring to FIG. 10, the STA sends an IAC frame to the AP, notifying of the wakeup in step 1001. The IAC frame includes an RDL(Reverse Direction Limit) indicating a transmission duration limit for the AP. Then the AP replies with an RAC frame within an SIFS(Short Inter Frame Space) in step 1003. The RAC frame contains an RDR Size indicating a transmission duration for aggregated frame transmission.

In step 1005, the STA creates an IAC frame in response to the RAC frame, aggregates the IAC frame, transmission frames, and a BA frame to one PPDU, and sends it within the SIFS to the AP. If buffered data for the STA exists in the AP, the IAC frame contains an RDG which grants a specified duration for a reverse direction PPDU.

The AP creates an RAC frame for the IAC frame, aggregates the RAC frame, transmission frames transmittable for the duration specified by the RDG, and a BA frame to one PPDU, and sends it within the SIFS to the STA in step 1007. If the AP does not have further data for the STA, the RAC frame contains an RDR Size indicating a transmission duration for the remaining data.

In step 1009, the STA creates an IAC frame in response to the RAC frame, aggregates the IAC frame, user data frames, and a BA frame to one PPDU, and sends it within the SIFS to the AP.

The AP creates an RAC frame for the IAC frame, aggregates the RAC frame, transmission frames transmittable for the duration specified by the RDG, and a BA frame to one PPDU, and sends it within the SIFS to the STA in step 1011. If the AP does not have further data for the STA, an RDR Size is set to '0' or an RDR of an RAC Mask is set to '0' in the RAC frame.

Upon receipt of the aggregation PPDU, the STA sends a BA frame for the aggregation PPDU to the AP within the SIFS in step 1013. If determining the absence of further data to receive from the AP by the RAC frame, the STA notifies the AP of transition to the sleep mode by setting the PS bit of the header in the BA frame to '1'. Meanwhile, if the TXOP still lasts, the STA sends a CF-End frame and transitions to the sleep mode in step 1015.

As described above, the AP does not recommend a wakeup time in the illustrated case of FIG. 10. Thus, the STA wakes up periodically or non-periodically according to its own decision.

Figure 11:
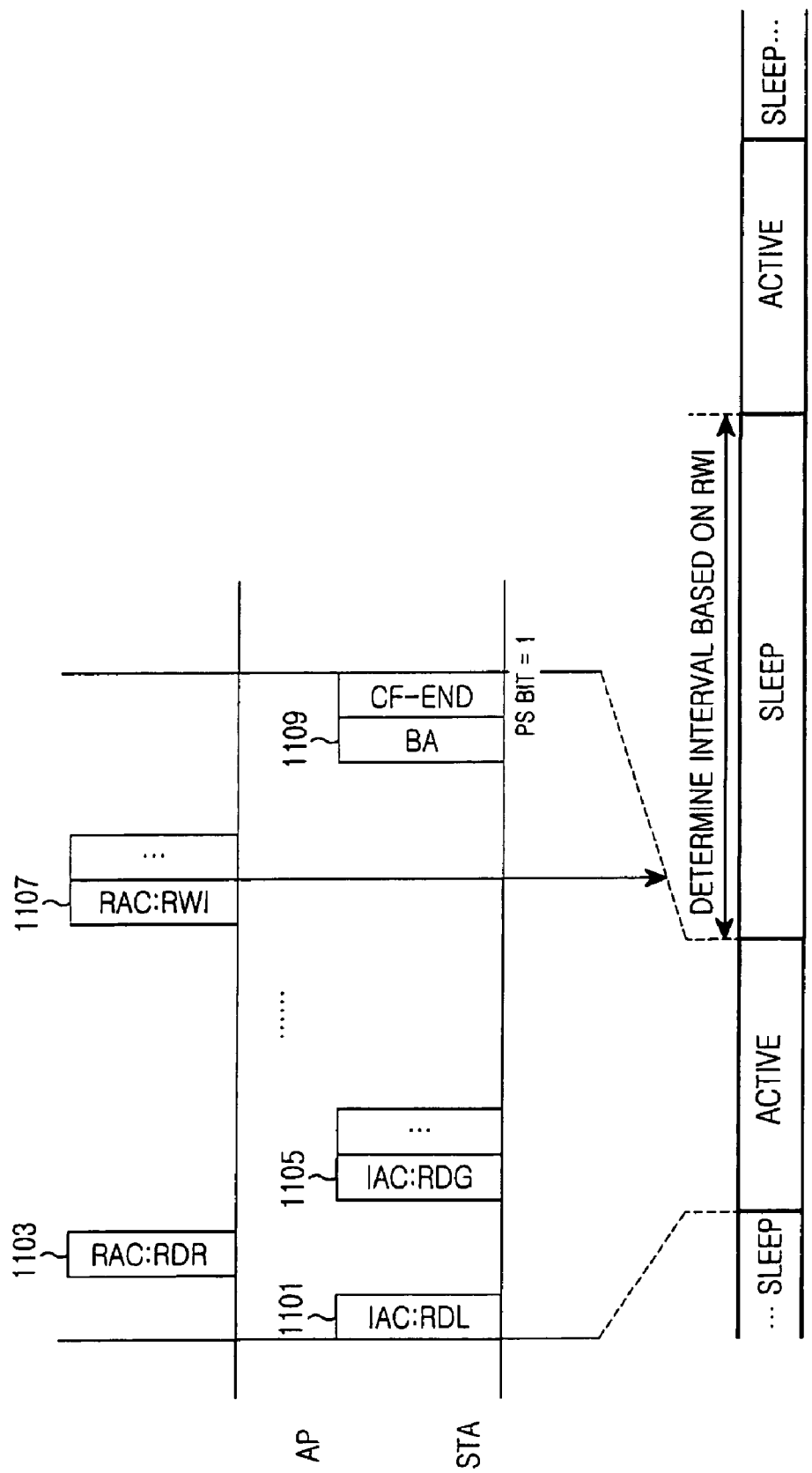
FIG. 11 is a diagram illustrating a signal exchange operation between the STA and the AP when a wakeup time is recommended in the wireless communication system according to the second embodiment of the present invention.

FIG. 11 is a diagram illustrating a signal exchange operation between the STA and the AP, particularly when the AP recommends a wakeup time in the wireless communication system according to the second embodiment of the present invention.

Referring to FIG. 11, steps 1101 through 1105 are performed in the same manner as illustrated in FIG. 10. In step 1107, the AP creates an RAC frame for a received IAC frame, aggregates the RAC frame, transmission frames transmittable for the duration specified by an RDG, and a BA frame to one PPDU, and sends it within the SWFS to the STA. If the AP does not have further data for the STA, the RAC frame contains an RWI.

Upon receipt of an aggregation PPDU, the STA sends a BA frame for the aggregation PPDU to the AP within the SIFS in step 1109. If determining the absence of further data to receive from the AP by the RAC frame, the STA notifies the AP of transition to the sleep mode by setting the PS bit of the header in the BA frame to '1'. At the same time, the STA determines a sleep interval based on the RWI of the RAC frame, as illustrated in FIG. 11.

As described above, the STA can request the AP to recommend a wakeup time by an RPS field in an IAC frame. If the RPS is set to '1', the AP recommends a wakeup time for the STA. If the RPS is set to '0', it does not recommend a wakeup time for the STA.

In accordance with the present invention, an STA can directly transition to the sleep mode after waking up according to service characteristics and processes data transmission and reception at one time, thereby saving power. The use of frame aggregation and a BA shortens a transmission duration, increasing the power-saving effect. Also, power-saving scheduling is possible by utilizing an AP-recommended wakeup interval. For example, the AP may recommend a wakeup interval satisfying a QoS requirement and scheduling that minimizes IAC contention among power-saving STAs is possible.

As described above, the AP does not recommend a wakeup time in the illustrated case of FIG. 8. Thus, the STA wakes up periodically or non-periodically according to its own decision.

While the invention has been shown and described with reference to certain preferred embodiments thereof, it will be understood by those skilled in the art that various changes in form and details may be made therein without departing from the spirit and scope of the invention as defined by the appended claims

What is claimed is:

1. A station device in a wireless communication system, the station device comprising:
   a protocol controller for generating a wake up frame indicating wakeup to an access point (AP) upon wakeup from a sleep mode, and generating a control information frame including a reception duration upon receipt of a buffer information frame including a requested transmission length from the AP and an AP-recommended wakeup duration;
   a frame aggregation controller for aggregating the control information frame including the reception duration and user data frames to one protocol data unit and providing the protocol data unit to a physical layer;
   a physical layer interface for receiving an aggregation protocol data unit including as many transmission frames as transmittable for the reception duration; power saving controller for determining a next wakeup time based on the AP-recommended wakeup duration.

2. The station device of claim 1, wherein, if the requested transmission length is set to zero, the control information frame indicates transition to the sleep mode to the AP.

3. The station device of claim 2, wherein the control information frame includes control information associated with frame aggregation.

4. An access point (AP) device in a wireless communication system, the AP device comprising
   a buffer for buffeting transmission frames for sleep-mode stations; a protocol controller for generating a buffer information frame including a requested transmission length according to the data of buffered data for one of the sleep-mode stations upon receipt of a wake up frame from a sleep-mode station, and generating a control information frame to be aggregated upon receipt of another control information frame including a reception duration from the station;

a buffer manager for reading as many transmission frames from the buffer as transmittable for the reception duration;

a wakeup time calculator for calculating a recommended wakeup interval for the station according to the statuses of stations and an amount of traffic, and providing the recommended wakeup interval to the protocol controller; and a frame aggregation controller for aggregating the control information frame to be aggregated and the transmission frames to one protocol data unit and providing the protocol data unit to a physical layer, wherein, if the buffer has further data for the station in addition to the protocol data unit, the control information frame to be aggregated includes a requested transmission length based on an amount of the data.

5. The AP device of claim 4, wherein the frames include information associated with frame aggregation.

6. The AP device of claim 4, wherein, if the buffer does not have further data for the station in addition to the protocol data unit, the control information frame to be aggregated includes the recommended wakeup interval for the station.

7. The AP device of claim 4, further comprising a power saving controller for managing information about the sleep-mode stations.

8. The AP device of claim 7, wherein, upon receipt of a control information frame indicating transition to the sleep mode from the station, the protocol controller notifies the power saving controller of the transition of the station to the sleep mode.

9. The AP device of claim 8, wherein the control information frame indicating transition to the sleep mode includes information associated with frame aggregation.

10. A communication method for a station in a wireless communication system, the method comprising the steps of:

sending a wake up frame indicating wakeup to an access point (AP), upon wakeup from a sleep mode;

determining, upon receipt of a buffer information flame including a requested transmission length from the AP, whether the AP has buffered data for the station;

sending a control information flame including a reception duration to the AP, in the presence of buffered data for the station in the AP;

aggregating the control information frame including the reception duration and user data frames to one protocol data unit and sending the protocol data unit to the AP; and receiving an aggregation protocol data unit including as many transmission frames as transmittable for the reception duration;

determining, upon receipt of the aggregation protocol data unit from the AP, whether the AP has further buffered data for the station by analyzing the control information frame in the aggregation protocol data unit;

resending another control information frame including another reception duration to the AP, in the presence of further buffered data for the station;

sending a block acknowledgement (BA) frame indicating transition to the sleep mode, in the absence of further buffered data for the station;

checking, in the absence of further buffered data for the station, a recommended wakeup interval in the control information frame in the aggregation protocol data unit; and determining a next wakeup time according to the recommended wakeup interval.

11. The communication method of claim 10, further comprising:

sending the control information frame indicating transition to the sleep mode to the AP and transitioning to the sleep mode, in the absence of buffered data for the station in the AP.

12. The communication method of claim 11, wherein the control information frame includes control information associated with frame aggregation.

13. The communication method of claim 11, wherein transitioning to the sleep mode includes:

determining whether a transmission opportunity (TXOP) period still exists; and sending a contention-free end (CF-End) frame and then transitioning to the sleep mode, if the TXOP period still exists.

14. The communication method of claim 10, further comprising:

after sending the BA frame indicating transition to the sleep mode, determining whether a transmission opportunity (TXOP) period still exists; and sending a contention-free end (CF-End) frame and then transitioning to the sleep mode, if the TXOP period still exists.

15. A communication method for an access point (AP) in a wireless communication system, the method comprising:

buffering transmission frames for sleep-mode stations in a sleep-mode buffer; sending, upon receipt of a wake up frame from a sleep-mode station, a buffer information frame including a requested transmission length according to the data of buffered frames for the station to the station;

generating a control information frame to be aggregated upon receipt of another control information frame including a reception duration from the station;

reading as many transmission frames as transmittable from a buffer for the reception duration;

calculating a recommended wakeup interval for the station according to the statuses of the stations and an amount of traffic; and aggregating the control information frame to be aggregated and the transmission frames to one protocol data unit, and sending the protocol data unit to the station, wherein, if the buffer does not have further data for the station in addition to the protocol data unit, the control information frame to be aggregated includes the recommended wakeup interval for the station.

16. The communication method of claim 15, wherein the control information frame includes information associated with frame aggregation.

17. The communication method of claim 15, wherein, if the sleep-mode buffer has further data for the station in addition to the protocol data unit, the control information frame to be aggregated includes a requested transmission length based on an amount of the data.

18. A power saving method in a wireless communication system, the method comprising the steps of:

buffering transmission frames for sleep-mode stations in a sleep-mode buffer by an access point (AP);

sending a wake up frame indicating wakeup to the AP, upon wakeup from a sleep mode by a station;

sending a buffer information frame including a requested transmission length in response to the wake up frame to the station by the AP;

generating a control information frame including a reception duration in response to the buffer information frame by the station;

aggregating the control information frame including the reception duration and user data frames to a first protocol data unit by the station;
sending the first protocol data unit to the AP by the station;
generating the control information to be aggregated in response to another control information frame including the reception duration by the AP;
aggregating the control information frame to be aggregated and buffered transmission frames for the station to a second protocol data unit by the AP; and
sending the second protocol data unit to the station by the AP,
wherein, if the AP does not have further data for the station in addition to the second protocol data unit, the control information frame to be aggregated includes a recommended wakeup interval for the station.

19. The power saving method of claim 18, further comprising:
sending another control information frame indicating transition to the sleep mode to the AP by the station, upon receipt of a control information frame with the requested transmission length set to zero.

20. The power saving method of claim 18, wherein, if the AP has further data for the station in addition to the second protocol data unit, the control information frame to be aggregated includes a requested transmission length based on an amount of the data.

21. The power saving method of claim 18, wherein the control information frame includes information associated with frame aggregation.

* * * * *